United States Patent
Urry et al.

(10) Patent No.: US 10,044,190 B2
(45) Date of Patent: Aug. 7, 2018

(54) DISTRIBUTED ENERGY SYSTEM WITH FOUR CONDUCTOR BIPOLAR DC BUS

(71) Applicant: Zyntony, Inc., Sandy, UT (US)

(72) Inventors: Robin Urry, Draper, UT (US); Roger Johnsen, Holladay, UT (US); Russell Scott, West Jordan, UT (US)

(73) Assignee: Zyntony, Inc., Sandy, UT (US)

( * ) Notice: Subject to any disclaimer, the term of this patent is extended or adjusted under 35 U.S.C. 154(b) by 224 days.

(21) Appl. No.: 14/700,218

(22) Filed: Apr. 30, 2015

(65) Prior Publication Data

US 2016/0322825 A1    Nov. 3, 2016

(51) Int. Cl.
*H02J 1/10*    (2006.01)
*H02J 3/38*    (2006.01)

(52) U.S. Cl.
CPC ............ *H02J 3/383* (2013.01); *H02J 1/102* (2013.01); *Y02E 10/563* (2013.01)

(58) Field of Classification Search
CPC ................................. H02J 1/102; H02J 3/383
USPC .......................................................... 307/43
See application file for complete search history.

(56) References Cited

U.S. PATENT DOCUMENTS

| | | |
|---|---|---|
| 7,443,052 B2 | 10/2008 | Wendt |
| 8,138,631 B2 | 3/2012 | Allen |
| 8,570,005 B2 | 10/2013 | Lubomirsky |
| 8,686,592 B2 | 4/2014 | Fontana |
| 9,225,286 B1* | 12/2015 | Tweedie .................. H02M 1/00 |
| 2007/0164612 A1 | 7/2007 | Wendt |
| 2010/0139945 A1* | 6/2010 | Dargatz ............ H01L 31/02008 174/116 |
| 2010/0295383 A1* | 11/2010 | Cummings ....... H01L 31/02021 307/151 |
| 2012/0042588 A1 | 2/2012 | Erickson |
| 2012/0299386 A1 | 11/2012 | Kaufman |
| 2012/0319494 A1 | 12/2012 | Ecrabey |
| 2013/0301314 A1 | 11/2013 | Fu |
| 2014/0265567 A1* | 9/2014 | Zubieta ..................... G05F 1/12 307/24 |
| 2014/0292303 A1 | 10/2014 | Zubieta |
| 2015/0244268 A1* | 8/2015 | Meinecke ............. H02M 3/158 323/271 |
| 2016/0241153 A1* | 8/2016 | Abeyasekera ........ H02M 7/493 |

OTHER PUBLICATIONS

Schonberger, DC-Bus Signaling: A Distributed Control Strategy for a Hybrid Renewable Nanogrid, IEEE Transactions on Industrial Electronics, Oct. 2006, pp. 1453-1460, vol. 53, No. 5.

\* cited by examiner

*Primary Examiner* — Jared Fureman
*Assistant Examiner* — Duc M Pham
(74) *Attorney, Agent, or Firm* — Travis R. Banta; TechLaw Ventures, PLLC

(57) ABSTRACT

In one embodiment, a direct current bus is disclosed. The direct current bus is a four conductor bus and comprises a positive voltage conductor, a neutral conductor, a negative voltage conductor, and a safety ground. The direct current bus may be implemented in a photovoltaic system to interconnect various components of the photovoltaic system.

19 Claims, 7 Drawing Sheets

DISTRIBUTED ENERGY SYSTEM WITH FOUR CONDUCTOR BIPOLAR DC BUS

BACKGROUND

1. Technical Field

This disclosure relates generally to direct current ("DC") busses for photovoltaic systems. More specifically, the system disclosed herein relates to a four conductor DC bus used to interconnect various DC components of a photovoltaic system in a way that makes the transfer of electrical power between the various DC components safer and more energy efficient.

2. Description of the Related Art

Photovoltaic systems convert solar energy into DC electricity. A simple photovoltaic system may include a solar panel and a power inverter. As the solar panel in the simple photovoltaic system absorbs solar energy, the solar panel creates DC electricity. The solar panel is typically connected to a power inverter via a DC bus to convert the DC electricity into alternating current ("AC") electricity used to power electrical devices. The solar panel produces DC electricity at a level that is proportional to the amount of sunlight received by the solar panel. As an example, during a particular day, the voltage level of the current supplied by the solar panel may range from approximately zero at dawn and dusk to thirty volts during maximum solar energy conditions.

Conventional DC and AC busses in photovoltaic systems carry electrical current at a particular voltage level from, for example, a solar panel, to an inverter using a bus. In a DC bus, one end of the wire is typically referred to as a V+, or positive voltage wire, while the other end of the wire in the DC bus is typically referred to as a V−, or negative voltage, wire. Conventional DC and AC busses are typically implemented using gauges of wire, a term which describes the diameter (or cross sectional area) of a particular wire used in the conventional DC or AC busses, suitable for the current level of the DC and AC busses. Conventional DC or AC busses in photovoltaic systems may allow a higher maximum electrical current level to be used if the gauge number of the wire is decreased (wires with greater diameter are lower gauge number wires than wires with a smaller diameter). For example, a DC or AC bus in a photovoltaic system may use 12 gauge stranded copper wire or 10 gauge solid copper wire. However, lower gauge number wires are typically more financially expensive than higher gauge number wires (because lower gauge number wires are larger in size, diameter, and cross sectional area than higher gauge number wires).

Thus, in photovoltaic systems that implement a conventional DC or AC bus that operates at a medium voltage (approximately 100-350 volts), the financial cost of the wire at a wire gauge number appropriate to support the conventional DC or AC bus may represent a substantial financial cost in designing, implementing, and using a photovoltaic system. Photovoltaic systems that implement a conventional DC or AC bus that operate at higher voltages (approximately more than 350 volts) can be implemented using wire with higher gauge numbers. Examples of DC and AC busses used in photovoltaic systems are discussed below.

FIG. 1 shows an implementation of photovoltaic system 100 that uses a traditional string topology. In this example, solar panels 105a, 105b, 105c to 105n (n solar panels) are connected to each other with a series DC bus 110 and to string inverter 115. Because of the series DC bus 110, if one of the solar panels is compromised by technical malfunction or other irregularity, the entire string of solar panels 105a-105n is compromised. That is to say, that when one of solar panels 105a-105n becomes shaded, for example, the electrical output of each panel within photovoltaic system 100 is reduced to the level of electrical output for the one shaded panel.

When photovoltaic system 100 is operating as designed, each of solar panels 105a-105n may contribute DC electrical voltage and electrical current to series DC bus 110 for inversion into AC electricity by string inverter 115. Depending on the number of solar panels 105a-105n in photovoltaic system 100, an electrical voltage of series DC bus 110 may be relatively high because the electrical voltage produced by each of solar panels 105a-105n is aggregated on series DC bus 110. Thus, in some cases, the electrical voltage of series DC bus 110 may be many hundred or even a thousand volts which may be close to or exceed a maximum voltage level allowed by a regulatory authority, during at least some portion of a day. In this situation, photovoltaic system 100 cannot be expanded to increase the overall electrical output level of photovoltaic system 100 as an expanded system would cause voltage levels on series DC bus 110 to be higher than would normally be allowed. Rather, in order to generate additional electrical power, a second photovoltaic system must be installed that is separate from photovoltaic system 100 and that provides a second serial DC bus to support additional solar panels. This is disadvantageous because a second photovoltaic system would include additional components at an additional cost that would, for the most part, be redundant in view of photovoltaic system 100 and less reliable. However, because of limits on the maximum voltage level allowed on a DC bus, adding additional photovoltaic systems may be the only acceptable method to increase overall electrical output of photovoltaic system 100. Also, operating the system at these high voltage levels increases the potential for electrocution, and increases the system complexity required to minimize this danger as well as minimize other undesirable side effects of high voltage including the potential to arc.

FIG. 2 shows an implementation of photovoltaic system 200 using an optimized string topology. In this example, each of solar panels 205a, 205b, 205c to 205n (n solar panels) is directly connected to a respective one of maximum power point converters 220a, 220b, 220c to 220n (n maximum power point converters). Each of maximum power point converters 220a-220n is connected by a series DC bus 210 to a string inverter 215. Series DC bus 210 is similar to series DC bus 110 shown in FIG. 1. However, conventional photovoltaic system 200 improves on conventional photovoltaic system 100 shown in FIG. 1 by providing maximum power point converters 220a-220n that monitor a maximum power point for their respective solar panel 205a-205n. In this way, maximum power point converters 220a-220n each independently adjust the electrical current through a respective solar panel to maximize the power harvested from a respective solar panel, providing the available DC electricity to string inverter 215, thus maximizing the electrical power available in photovoltaic system 200.

For example, assume photovoltaic system 200 is installed on a residential rooftop. Solar panels 205a-205n absorb solar energy and produce DC electricity which is conducted to their respective maximum power point converters 220a-220n. However, just after noon, a chimney begins to cast a shade on solar panel 205a. Maximum power point converter 220a, recognizes that the DC electricity supplied by solar panel 205a is reduced because of the shading and its own operating characteristics are independently adjusted to correspond with a shaded operating condition. Thus, unlike photovoltaic system 100, shown in FIG. 1, in which all solar panels' energy production would be compromised by the reduced output of solar panel 205a, photovoltaic system 200 operates more efficiently (than photovoltaic system 100 shown in FIG. 1). This is because the energy output of each of solar panels 205a-205n in photovoltaic system 200 is independently maximized on a per-panel basis by maximum power point converters 220a-220n.

While photovoltaic system 200 is an improvement on photovoltaic system 100 shown in FIG. 1, photovoltaic system 200 introduces many more devices (maximum power point converters 220a-220n), each of which bring an additional capacity to fail and increase the financial cost of photovoltaic system 200 because for every new solar panel incorporated into a homeowner's system, the homeowner must also purchase an additional module to manage the new solar panel. Furthermore, even though photovoltaic system 200 includes maximum power point converters 220a-220n, photovoltaic system 200 still uses series DC bus 210 and therefore experiences many of the same limitations discussed above with respect to series DC bus 110 shown in FIG. 1.

FIG. 3 shows an implementation of photovoltaic system 300 using conventional microinverter topology. In this example, each of solar panels 305a, 305b, 305c to 305n (n solar panels) is directly connected to a respective one of microinverters 315a, 315b, 315c to 315n (n microinverters). Each of microinverters 315a-315n in photovoltaic system 300 is connected in a parallel electrical connection as opposed to the series electrical connection described above with respect to photovoltaic systems 100 and 200. Microinverters 315a-315n are configured to receive DC electricity from solar panels 305a-305n and invert the DC electricity to create AC electricity. Microinverters 315a-315n therefore output AC electricity into an AC bus ("AC bus") 310. Microinverters 315a-315n may also monitor a maximum power point for a respective solar panel 305a-305n in order to maximize, on a per panel basis, the electrical power provided to AC bus 310. AC bus 310 operates at a medium voltage level with higher current carrying requirements than other higher voltage systems producing the same or similar amounts of power. Therefore, AC bus 310 must either be implemented using lower gauge number wires to accommodate the higher current of photovoltaic system 300, or the number of solar panels in one bus circuit of photovoltaic system 300 must be reduced to prevent overload if higher gauge number wires are used with the intent of reducing cost. Because photovoltaic system 300 is a 240 volt split phase system that operates in a medium voltage range, the higher AC current contribution per solar panel to AC bus 310 limits the number of solar panels that can be included in photovoltaic system 300 before requiring additional bus circuits to accommodate higher power production.

Photovoltaic system 300 enjoys at least one advantage over photovoltaic systems 100 and 200, described above with respect to FIGS. 1 and 2. Specifically, since photovoltaic system 300 is configured with each of solar panels 305a-305n and a respective each of microinverters 315a-315n in a parallel electrical connection to a bus, a failure in one of solar panels 305a-305n or microinverters 315a-315n will not compromise the electrical output of the entire system, unlike photovoltaic systems 100 and 200 described above with respect to FIGS. 1 and 2. At the same time, however, the use of microinverters 315a-315n requires that every solar panel in photovoltaic system 300 also directly connect to a microinverter. Thus, the financial cost of photovoltaic system 300 is much greater because a homeowner must buy a microinverter for each solar panel the homeowner intends to use. Furthermore, as in system 200, each additional microinverter that is included in photovoltaic system 300 provides an additional point of failure which is a particular concern given that microinverters 315a-315n contain electrical elements that are particularly susceptible to the extreme weather conditions that can be experienced on a rooftop. More specifically, because microinverters 315a-315n are used to invert DC electricity to create AC electricity, they frequently contain electrolytic capacitors that can be sensitive to temperature and humidity that can be experienced on a rooftop. Microinverters 315a-315n are also complex, requiring more electrical components (than maximum power point converters 220a-220n of photovoltaic system 200, shown in FIG. 2) making microinverters 315a-315n more expensive in terms of equipment costs and less reliable, due to the large number of electrical components exposed to harsh conditions. Also, in attempting to mitigate excessive reliability problems, these components must typically be specified as higher-grade versions able to withstand wider temperature extremes, which significantly increases costs. Thus, while the consequences of one of solar panels 305a-305n or corresponding microinverters 315a-315n failing are reduced by the parallel electrical connection of photovoltaic system 300, the need to supply a microinverter with every solar panel increases the number of devices in photovoltaic system 300 that can fail and affect system reliability, as compared with photovoltaic system 100. Photovoltaic system 300 is also more expensive, more complex, and more subject to reliability problems than photovoltaic system 200.

Microinverter technology in photovoltaic system 300 suffers from another drawback. As discussed above, each of microinverters 315a-315n invert DC electricity supplied by solar panels 305a-305n into AC electricity. In the configuration described as photovoltaic system 300, this inversion of DC electricity into AC electricity is inefficient for two reasons. First, because the DC voltage output by solar panels 305a-305n is relatively low, each of microinverters 315a-315n must increase the voltage before the DC electricity can be converted into AC electricity that is usable in an electrical device. However, because each voltage increase and waveform conversion is subject to inherent inefficiencies, microinverters 315a-315n introduce electrical losses into photovoltaic system 300. Second, the inherent inefficiencies of increasing voltage and converting DC into AC are compounded in photovoltaic system 300 because each of microinverters 315a-315n is individually increasing voltage and converting the waveform independently of every other microinverter in photovoltaic system 300. Thus, less efficient inversions are performed by each of microinverters 315a-315n which are aggregated in the configuration of photovoltaic system 300. In other words, many small inefficient inversions performed by the microinverters 315a-315n sum to a total energy loss for photovoltaic system 300 that, on the whole, would be larger than the loss experienced by photovoltaic system 300 if a single inversion was to be performed on the aggregated current from the solar panels in a centralized inverter, such as in system 100. Accordingly, the use of an AC bus, such as AC bus 310, results in a photovoltaic system with the foregoing inefficiencies and therefore less desirable than other alternatives in that regard.

FIG. 4 shows an implementation of photovoltaic system 400 using a dual DC output converter device. Photovoltaic system 400 includes a solar panel 405 which is connected to a DC to DC converter 410. DC to DC converter 410 receives DC at a particular voltage from solar panel 405 and converts the DC at a particular voltage to DC at a higher voltage that is specified for inversion to AC by inverter 415. Dual DC bus 420 connects DC to DC converter 410 to inverter 415.

Dual DC bus 420 includes a positive voltage wire 425, also referred to as V+, a negative voltage wire 430, also referred to as V−, and a ground wire 435. Thus, dual DC bus 420 is implemented as a three wire bus. In the implementation of FIG. 4, DC to DC converter 410 converts a floating DC voltage from solar panel 405 into a dual DC output. The dual DC output refers to the output of DC electricity on both the V+ positive voltage wire 425 and the V− negative voltage wire 430. Ground wire 435 provides a reference low voltage that allows DC on both the V+ positive voltage wire 425 and the V− negative voltage wire 430 to flow. However, in this configuration, ground wire 435 is used as a current return for the V+ positive voltage wire 425 and the V− negative voltage wire 430. This is undesirable as current flow to ground can be dangerous, causing electrical fires or creating electrocution hazards. Regardless, inverter 415 converts the DC electricity to AC electricity in three phases, phase 440, phase 445, and phase 450. AC electricity may then be provided to AC loads 455.

FIG. 5 illustrates a distributed energy system 500 that includes a solar panel 505 which is connected to solar panel interface 510. Solar panel interface 510 is connected to inverter 515 via a split rail DC bus 540. Distributed energy system 500 further includes battery 520 connected to battery interface 525 and wind turbine 530 which is connected to wind turbine interface 535. Battery interface 525 and wind turbine interface 535 are also connected to split rail DC bus 540.

Split rail DC bus 540 includes a pair of split DC rails. These split DC rails are shown as a positive voltage rail V+ 545 and a negative voltage rail V− 550. Accordingly, split rail DC bus 540 is implemented as a two wire system where positive voltage rail V+ 545 and negative voltage rail V− 550 are referenced to ground at inverter 515. In use, positive voltage rail V+ 545 and negative voltage rail V− 550 support substantially equal and opposite voltages.

As mentioned above, inverter 515 is further connected to split rail DC bus 540 and includes a pulse width modulation circuit 555 that includes two half bridge capacitors one of which is connected on one side to positive voltage rail V+ 545 and the other of which is connected on one side to negative voltage rail V− 550. The two half bridge capacitors in pulse width modulation circuit 555 are both connected on their respective other sides to ground, as shown in FIG. 5. Inverter 515 includes pulse width modulation circuit 555 to create a sinusoidal output current from the DC input. The sinusoidal output current is the basis for AC electricity. Inverter 515 therefore creates AC electricity from the DC electricity on split rail DC bus 540. Inverter output 560 connects the AC electricity to either the electrical grid or electrical devices that operate on AC electricity.

FIG. 6 shows a bipolar DC electrical generation system 600. Bipolar DC electrical generation system 600 includes a DC to DC converter 605 which includes a high voltage bipolar DC bus 610 and a low voltage bipolar DC bus 615. In this implementation, high voltage bipolar DC bus 610 includes a positive voltage source $V_{H+}$ 620 and a negative voltage source $V_{H−}$ 625. High voltage bipolar DC bus 610 is midpoint grounded at ground 630. Low voltage bipolar DC bus 615 includes a positive low voltage point $V_{L+}$ 635 and a negative low voltage point $V_{L−}$ 640. Low voltage bipolar DC bus 615 is midpoint grounded at ground 645. Thus, in this implementation, bipolar DC electrical generation system 600 uses a three wire bus for high voltage bipolar DC bus 610 (positive voltage source $V_{H+}$ 620, negative voltage source $V_{H−}$ 625, and ground 630) and a second three wire bus for low voltage bipolar DC bus 615 (positive low voltage point $V_{L+}$ 635, negative low voltage point $V_{L−}$ 640, and ground 645).

DC to DC converter 605 converts voltage from positive voltage source $V_{H+}$ 620 and negative voltage source $V_{H−}$ 625 to electrical power at a lower voltage at positive low voltage point $V_{L+}$ 635 and negative low voltage point $V_{L−}$ 640. Positive low voltage point $V_{L+}$ 635 and negative low voltage point $V_{L−}$ 640 may be used to supply power via low voltage bipolar DC bus 615 to various electrical devices at voltage levels that are significantly lower than what would be provided by high voltage bipolar DC bus 610.

Each of the foregoing conventional photovoltaic systems implement a two or three wire bus. Some of these two and three wire busses are powered at a voltage that requires a lower gauge number of wire and increases the overall expense of the photovoltaic system, or limits the amount of power the system can handle due to a chosen wire gauge number. Furthermore, some of these two and three wire busses operate at a voltage high enough to create at least some safety concerns and require more complex solutions to mitigate these concerns. Also, as discussed above, some conventional photovoltaic systems implement a DC bus in a way that reduces the effectiveness of the entire conventional photovoltaic system in the event of a technical malfunction or a solar panel irregularity.

It is therefore one object of this disclosure to provide a four conductor bipolar DC bus. It is a further object of this disclosure to implement the four conductor bipolar DC bus in a way that not only reduces the potential for technical malfunction but also eliminates the possibility of a solar panel irregularity from reducing the effectiveness of other parts of the photovoltaic system.

Another object of this disclosure is to describe a four conductor bipolar DC bus that enhances the safety of working on or installing a photovoltaic system while enhancing the efficiency of the photovoltaic system. It is a further object of this disclosure to provide a photovoltaic system that includes a four conductor bipolar DC bus.

SUMMARY

In one embodiment, a DC bus is disclosed. The DC bus is a four conductor bus and comprises a positive voltage conductor, a neutral conductor, a negative voltage conductor, and a safety ground.

Further disclosed is a photovoltaic system which comprises a DC bus. The DC bus comprises a positive voltage conductor, a neutral conductor, a negative voltage conductor, and a safety ground. The photovoltaic system further includes a plurality of electrical generators. In one embodiment the photovoltaic system may include an inverter.

In another embodiment, a DC bus comprises a first conductor, a second conductor, a third conductor, and a safety ground.

BRIEF DESCRIPTION OF THE DRAWINGS

The accompanying drawings illustrate several embodiments of the four conductor bipolar DC bus itself and as it is used in a photovoltaic system. The illustrated embodiments are exemplary and do not limit the scope of the disclosure.

DETAILED DESCRIPTION OF PREFERRED EMBODIMENTS

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
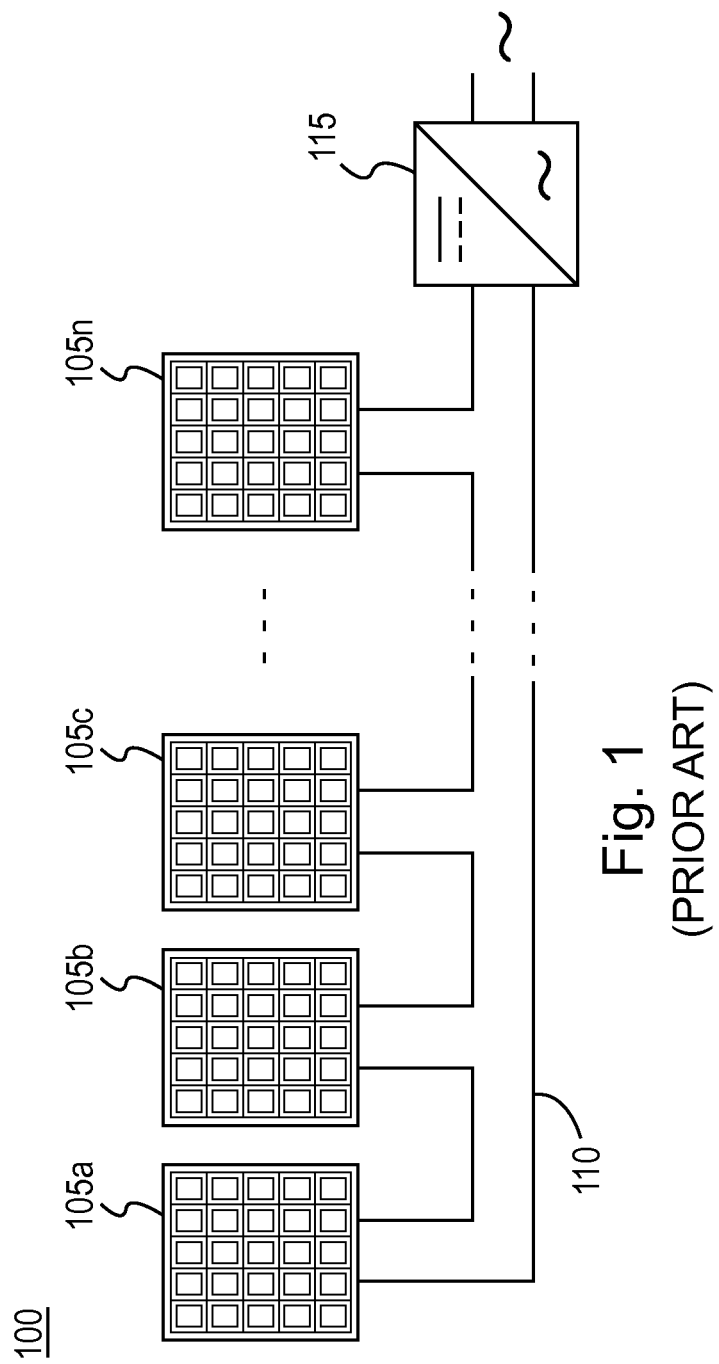
FIG. 1 illustrates a traditional string topology for a photovoltaic system.
Figure 2:
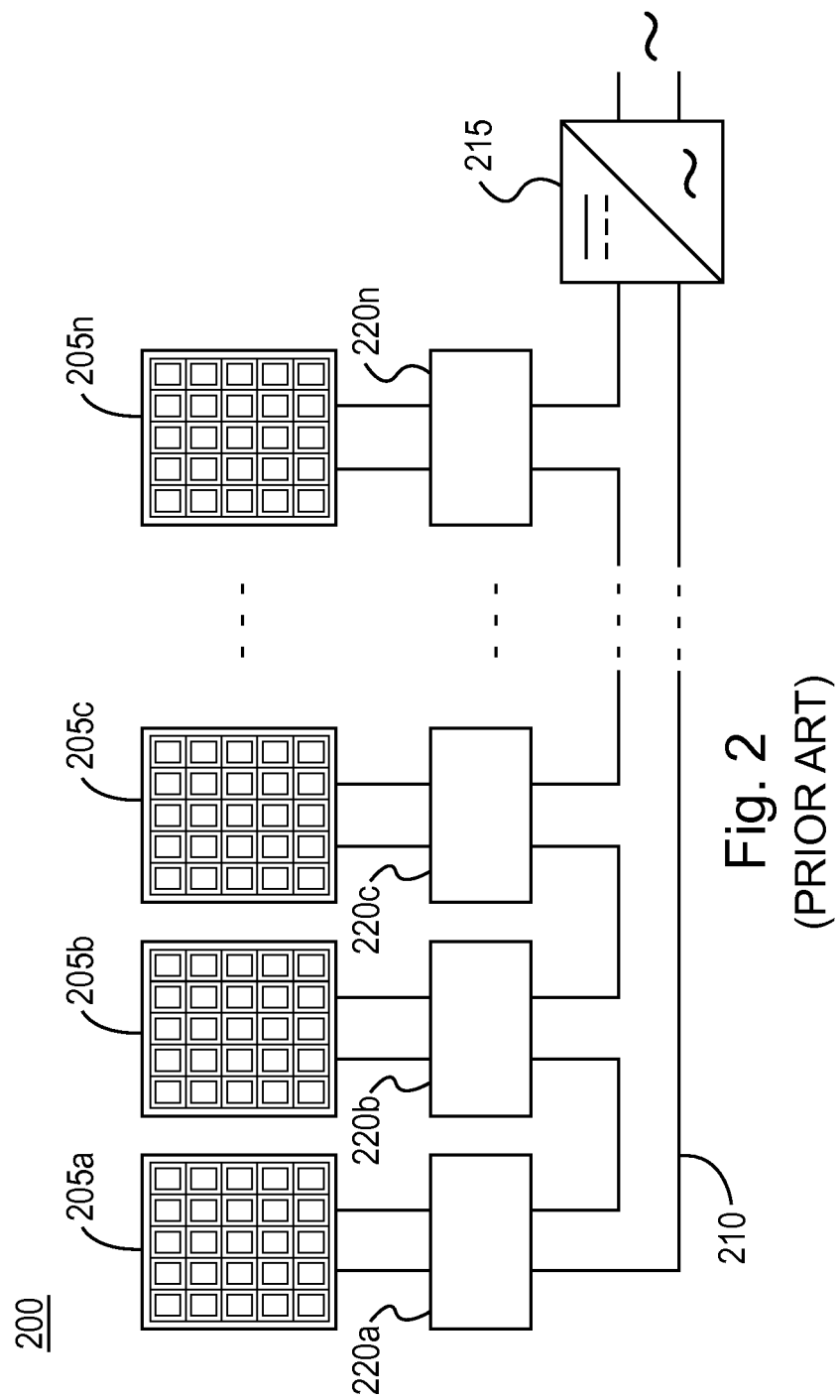
FIG. 2 illustrates an optimized string topology for a photovoltaic system.
Figure 3:
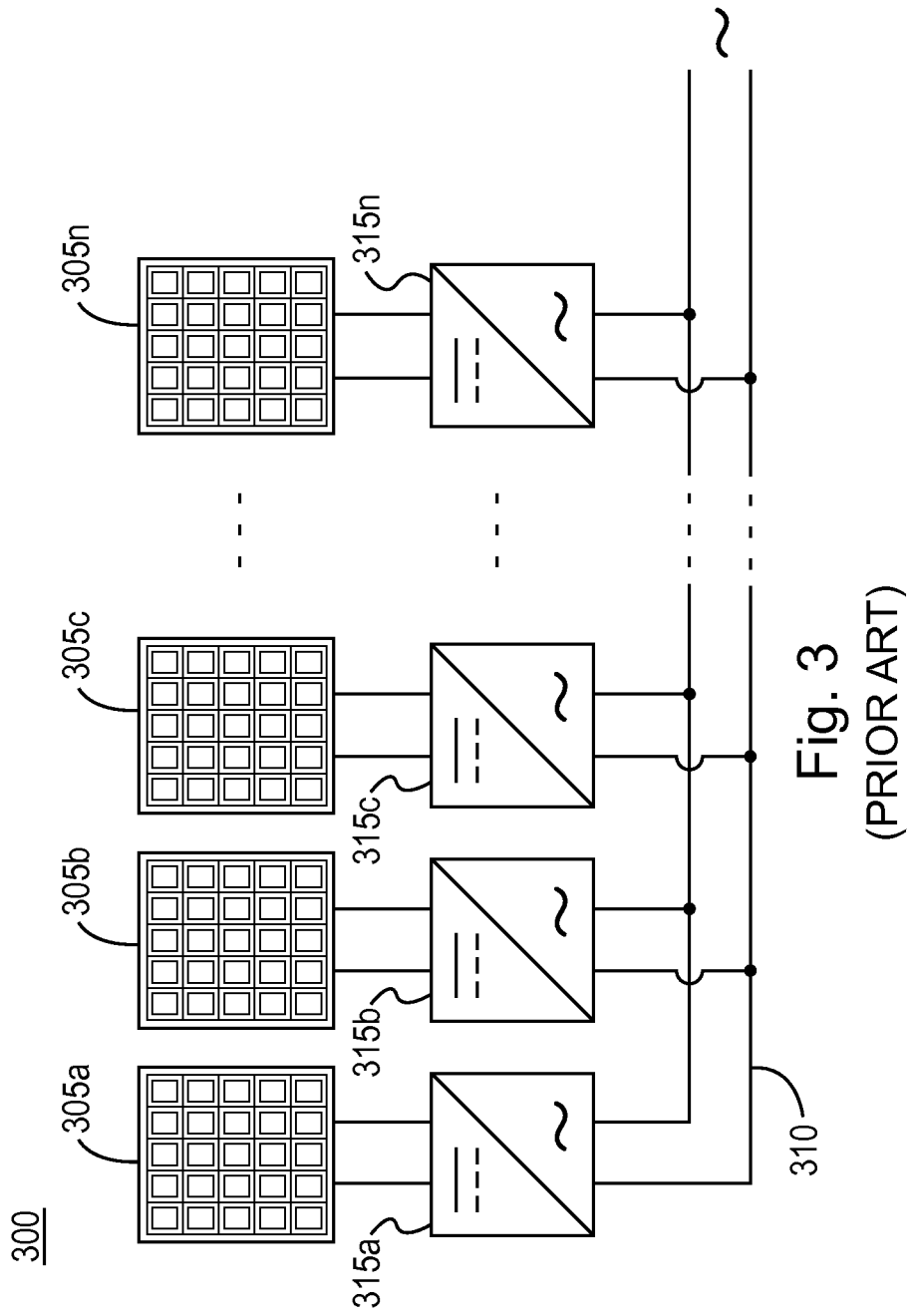
FIG. 3 illustrates a microinverter topology for a photovoltaic system.
Figure 4:
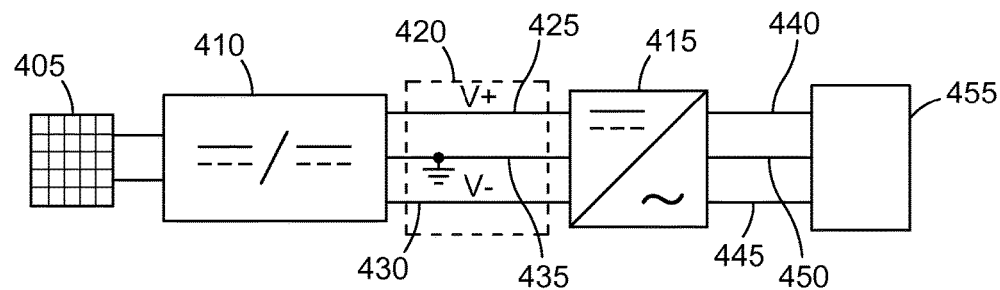
FIG. 4 illustrates a photovoltaic system that employs a dual DC bus.
Figure 5:
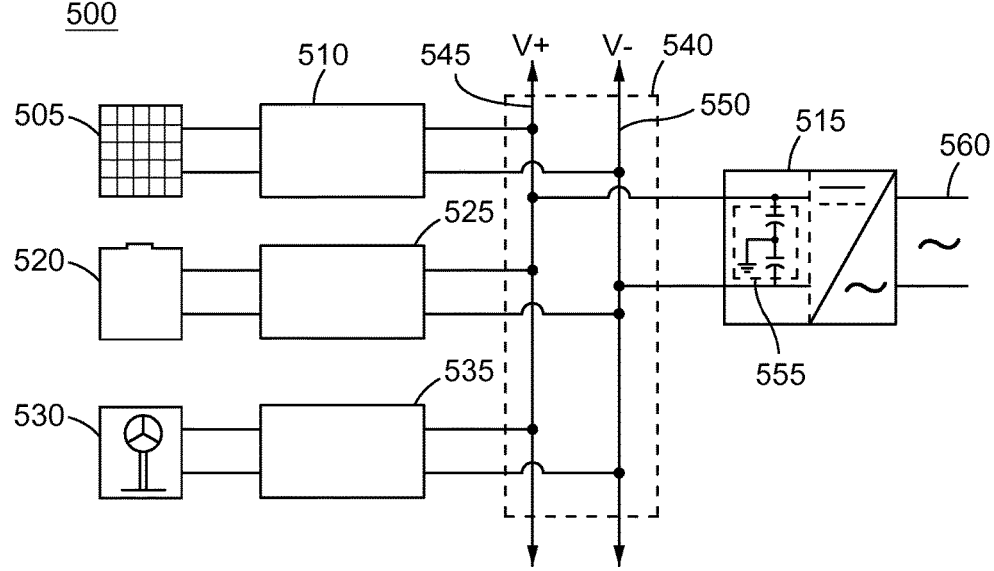
FIG. 5 illustrates a distributed energy system that employs a split rail DC bus.
Figure 6:
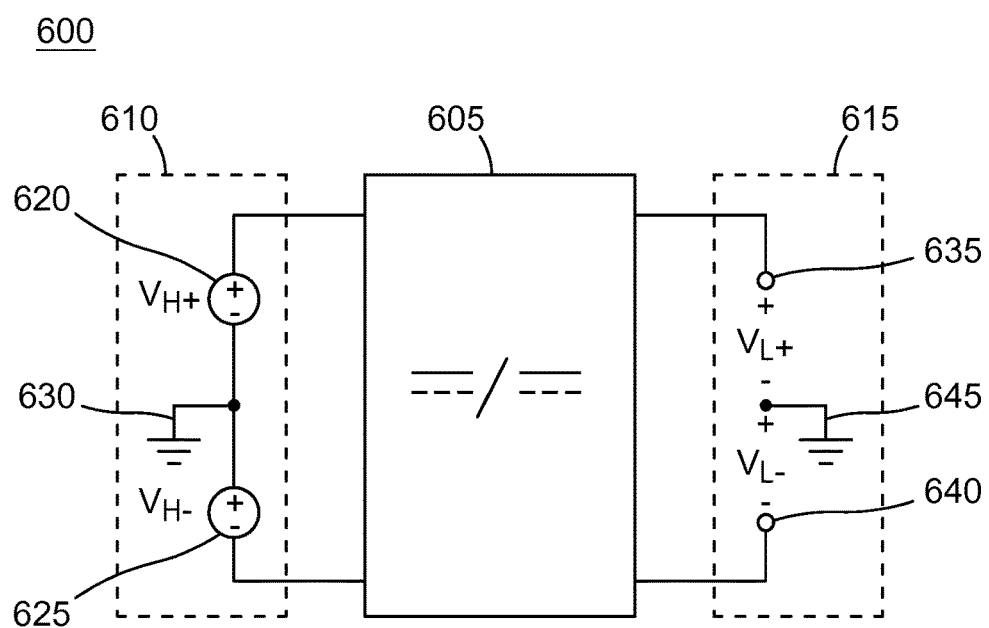
FIG. 6 illustrates a bipolar DC electrical generation system which includes a high voltage bipolar DC bus and a low voltage bipolar DC bus.
Figure 7:
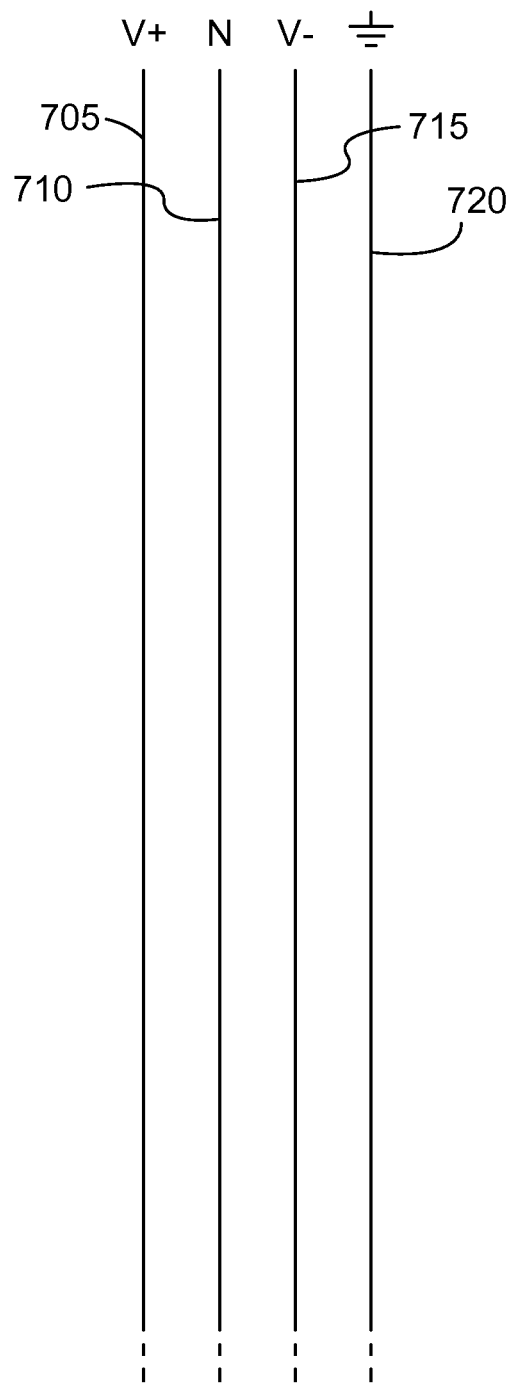
FIG. 7 illustrates an exemplary four conductor bipolar DC bus.

FIG. 7 illustrates an exemplary four conductor bipolar DC bus 700. Four conductor bipolar DC bus 700 includes four conductors, positive voltage conductor $V_+$ 705, neutral conductor N 710, negative voltage conductor $V_-$ 715, and safety ground conductor 720. As used herein, the term "conductor" is defined to mean any electrically conductive material or metal. Examples of conductors may include stranded or solid copper wire, aluminum wire, silver wire, gold or gold plated wire, metal platings, metal depositions, metal alloys, conductive traces and planes on rigid and flexible circuit boards, elemental metals that have been purified for use in electrical applications, and any other electrically conductive material or metal. In one embodiment, four conductor bipolar DC bus 700 is implemented as four parallel solid copper wires insulated from each other by an electrical insulator, such as a molded flexible plastic. In another example, four conductor bipolar DC bus 700 could be implemented using four coaxial conductors separated from each other by an electrical insulator but disposed within a single molded wire. Four conductor bipolar DC bus 700 may be implemented as four separate insulated wires or, alternatively, may be disposed together within the same housing.

In four conductor bipolar DC bus 700, positive voltage conductor $V_+$ 705 and negative voltage conductor $V_-$ 715 share the electrical load of the bus in, for example, a photovoltaic system. This implementation allows four conductor bipolar DC bus 700 to split the voltage carried by the four conductor bipolar DC bus 700 between positive and negative polarities. One benefit of this implementation is that because the voltage of four conductor bipolar DC bus 700 is split between two polarities, the voltage on any single conductor as referenced to either neutral or ground is significantly reduced over other DC busses, such as some of those discussed above. Another benefit of this implementation is that four conductor bipolar DC bus 700 may be implemented using a higher gauge number wire, lessening the financial cost of implementing four conductor bipolar DC bus 700.

In one embodiment, the voltage supported by positive voltage conductor $V_+$ 705 and negative voltage conductor $V_-$ 715 is approximately within the range of 175 to 225 volts for each conductor (referenced to ground) with approximately 200 volts being preferable. Thus, the combined voltage of positive voltage conductor $V_+$ 705 and negative voltage conductor $V_-$ 715 is similar to the electric potential available in a 350 to 450 volt unipolar system, with the advantage of being able to use a higher gauge number conductor with a smaller diameter or cross sectional area to accommodate a given level of power. (Approximately 175 to 225 volts on the positive voltage conductor $V_+$ 705 plus approximately 175 to 225 volts on the negative voltage conductor $V_-$ 715 equals approximately 350 to 400 volts of electrical potential). Furthermore, because no single conductor in four conductor bipolar DC bus 700 supports a voltage greater than approximately positive or negative 175 to 225 volts, the electrical potential of each conductor is much lower than in unipolar systems intended to supply the same power level as a given bipolar system. Thus, four conductor bipolar DC bus 700 results in an environment that is significantly safer than those provided by other busses that support much higher voltages by reducing potential electrocution hazards. The lower electrical potential per conductor in four conductor bipolar DC bus 700 also lowers arc-fault requirements, does not require the use of higher voltage rated electrical components, makes circuit design more straightforward, uses more commonly available circuit components, provides a potential for more compact electrical circuit designs in particular areas of the circuit board design, and results in opportunities to lower the financial cost of products associated with four conductor bipolar DC bus 700.

Neutral conductor N 710 in four conductor bipolar DC bus 700 serves as a current return for both of positive voltage conductor $V_+$ 705 and negative voltage conductor $V_-$ 715 simultaneously. Neutral conductor N 710 further provides a simple and straightforward interface with an inverter, providing the opportunity to connect to a neutral connection on an inverter. Thus, neutral conductor N 710 may be carried through four conductor bipolar DC bus 700 and further interconnect with a neutral connection on the AC side of an inverter. Alternatively, neutral conductor N 710 may be indirectly connected to or referenced to an AC neutral connection in the inverter through other electrical components such as resistors, capacitors, and/or inductors, for example.

Safety ground conductor 720 operates as a true earth ground safety ground. Safety ground conductor 720 carries substantially no current unless an electrical fault occurs somewhere within four conductor bipolar DC bus 700. For example, a high voltage conductor in a photovoltaic system may come into contact with a metal chassis of a component in the photovoltaic system. For example, positive voltage conductor $V_+$ 705 attached to a terminal of the inverter may become loose and come into electrical contact with a metal chassis of the inverter, thus energizing the metal chassis. Should a person come into contact with the metal chassis of the inverter while it is energized by the loose wire, the person could be electrocuted. However, because safety ground conductor 720 is electrically connected to the metal chassis of each component in a photovoltaic system, safety ground conductor 720 can provide a low impedance electrical current path to divert the current from the metal chassis of the inverter to ground, bypassing the human body as a conduction path. When the electricity from the inverter metal chassis is diverted to ground by safety ground conductor 720, a surge of high current occurs which creates an electrical fault and trips protective fuses or electrical circuit breakers in the photovoltaic system.

It is additionally worthy to note that safety ground conductor 720 is not designed to operate as a current return in contrast with the ground reference in some conventional systems. As discussed above, safety ground conductor 720 is designed to not carry any electrical current unless an electrical fault occurs within a photovoltaic system. Therefore, four conductor bipolar DC bus 700 has a significantly lower risk of causing personal harm or electrical fires than at least some conventional systems. Thus, four conductor bipolar DC bus 700 provides significant safety improvements over at least some conventional systems.

Figure 8:
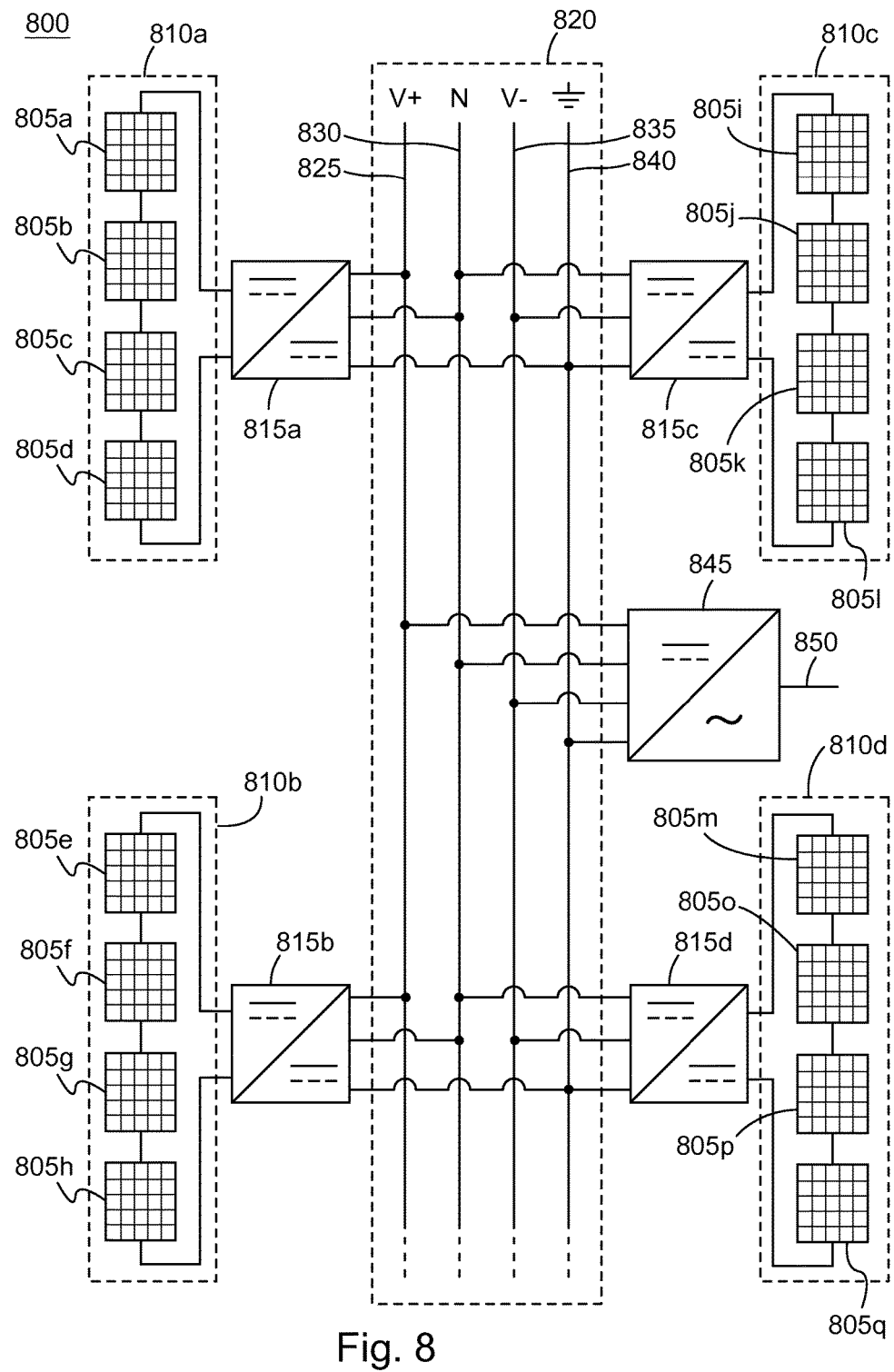
FIG. 8 illustrates a photovoltaic system that employs the four conductor bipolar DC bus.

FIG. 8 illustrates a photovoltaic system 800 that employs the four conductor bipolar DC bus 700 shown in FIG. 7, represented in FIG. 8 as four conductor bipolar DC bus 820. Photovoltaic system 800 includes a plurality of electrical generators as solar panels 805a, 805b, 805c, and 805d, which are connected to each other in a series electrical configuration as a short-string of solar panels 810a. Solar panels 805a, 805b, 805c, and 805d are exemplary electrical generators. Other electrical generators such as wind turbines, water turbines, other hydropower generators, geothermal generators, or any other renewable energy generator could replace solar panels 805a-805d in short-string of solar panels 810a. Electrical generators could also be implemented using non-renewable energy generators such as a plurality of fuel cells and other chemical fuel based electrical generators.

Short-string of solar panels 810a is connected to a short-string optimizer 815a which serves as a DC to DC converter with maximum power point tracking technology. Further included in photovoltaic system 800 are solar panels 805e, 805f, 805g, and 805h, which are connected to each other in a series electrical configuration as another short-string of solar panels 810b. Here also, the short-string of solar panels 810b is connected to another short-string optimizer 815b which serves as a DC to DC converter with maximum power point tracking technology.

Photovoltaic system 800 further includes solar panels 805i, 805j, 805k, and 805l which are connected to each other using a series electrical configuration and implemented as a short-string of solar panels 810c. Short-string of solar panels 810c is connected to short-string optimizer 815c, which also serves as a DC to DC converter with maximum power point tracking technology. Similarly, photovoltaic system 800 further includes solar panels 805m, 805o, 805p, and 805q which are connected to each other using a series electrical configuration and implemented as a short-string of solar panels 810d. Short-string of solar panels 810d is connected to short-string optimizer 815d, which also serves a DC to DC converter with maximum power point tracking technology.

Short-string optimizer 815a and short-string optimizer 815b are connected to four conductor bipolar DC bus 820 in a parallel electrical configuration and are said to be connected to a positive polarity of photovoltaic system 800. At the same time, short-string optimizers 815c and 815d are connected to four conductor bipolar DC bus 820 in a parallel electrical configuration and are said to be connected to a negative polarity of photovoltaic system 800. In this embodiment, a positive voltage output of each of short-string optimizers 815a and 815b is connected to positive voltage conductor $V_+$ 825, a negative output of each of short-string optimizers 815a and 815b is connected to neutral conductor N 830, and short-string optimizers 815a and 815b are electrically connected to safety ground conductor 840. A positive voltage output of each of short-string optimizers 815c and 815d is connected to neutral conductor N 830, a negative voltage output of each of short-string optimizers 815c and 815d is connected to negative voltage conductor $V_-$ 835, and short-string optimizers 815c and 815d are electrically connected to safety ground conductor 840.

Thus, short-string optimizers 815a and 815b are connected to short-string optimizers 815c and 815d in a parallel manner although connected to opposite polarities of four conductor bipolar DC bus 820. As shown in FIG. 8, positive voltage conductor $V_+$ 825 receives DC electricity generated by solar panels 805a-805d in short-string of solar panels 810a via short-string optimizer 815a, and solar panels 805e-805h in short-string of solar panels 810b via short-string optimizer 815b. Negative voltage conductor $V_-$ 835 receives DC electricity generated by solar panels 805i-805k in short-string of solar panels 810c via short-string optimizer 815c, and solar panels 805m and 805o-805q in short-string of solar panels 810d via short-string optimizer 815d.

Connecting short-string optimizers 815a and 815b in a parallel manner with short-string optimizers 815c and 815d via four conductor bipolar DC bus 820 provides a number of advantages. First, if, for example, solar panel 805c becomes shaded during some portion of a day, or the power generated by solar panel 805c is reduced for some reason, solar panels 805a-805d are isolated from the rest of photovoltaic system 800 by virtue of the parallel electrical connection of short-string optimizer 815a with short-string optimizer 815b and the parallel manner of connection with short-string optimizers 815c and 815d. Thus, while the electrical output of solar panels 805a, 805b, and 805d would be reduced to the level of electrical output of solar panel 805c, because solar panels 805a-805d are connected in a series electrical connection, the corresponding relatively low level of electrical output of short-string optimizer 815a does not reduce the electrical output of, for example, short-string of solar panels 810b and short-string optimizer 815b. Accordingly, the parallel topology of photovoltaic system 800 prevents a single short-string optimizer from reducing the power generated by other short-strings of solar panels within photovoltaic system 800. At the same time, the energy generated by each of short-strings of solar panels 810a-810d is aggregated on four conductor bipolar DC bus 820 while being split into positive and negative polarities. Thus, four conductor bipolar DC bus 820 provides for isolation between short-strings of solar panels, while reducing the voltage level, as referenced to ground, of any individual conductor within photovoltaic system 800 and while maintaining a relatively high voltage for four conductor bipolar DC bus 820 as a whole at a level suitable for either the use of cheaper higher gauge number conductors, or allowing a greater number of solar panels in a bus circuit, given a particular wire gauge. Four conductor bipolar DC bus 820 also provides a simple and straightforward connection for each short-string optimizer in photovoltaic system 800 to contribute electrical current to four conductor bipolar DC bus 820.

This parallel electrical configuration further simplifies the process of adding additional short-strings of solar panels and short-string optimizers to photovoltaic system 800. Thus, additional short-strings of solar panels could be easily implemented in photovoltaic system 800 which would also experience a certain level of independence and isolation from any of the other short-strings of solar panels implemented in photovoltaic system 800 while contributing electrical power to the overall system.

Neutral conductor N 830 in four conductor bipolar DC bus 820 serves as a current return for both of positive voltage conductor $V_+$ 825 and negative voltage conductor $V_-$ 835 simultaneously. Neutral conductor N 830 further provides a simple and straightforward opportunity to connect to a neutral connection of inverter 845. Thus, neutral conductor N 830 may be carried through four conductor bipolar DC bus 820 through inverter 845, and further act as a neutral on the AC side of inverter 845. Alternatively, neutral conductor N 830 may be indirectly connected or referenced to an AC neutral connection in inverter 845 through other electrical components such as resistors, capacitors, and/or inductors, for example.

Safety ground conductor 840 operates as a safety ground. Safety ground conductor 840 carries substantially no current unless an electrical fault occurs somewhere within four conductor bipolar DC bus 820. For example, if either of positive voltage conductor $V_+$ 825 or negative voltage conductor $V_-$ 835 come into electrical contact with, for example, a metal chassis of one of the components within photovoltaic system 800 in one type of electrical fault, safety ground conductor 840 safely diverts electrical current that could otherwise cause a fire or create a dangerous electrocution hazard as discussed above, with respect to FIG. 7. Safety ground conductor 840 is typically connected to a metal chassis of short-string optimizer 815a, short-string optimizer 815b, short-string optimizer 815c, short-string optimizer 815d, and inverter 845, metallic chassis components associated with inverter 845 including, but not limited to ground brackets, mounting brackets, and ground straps, and any other metallic component within photovoltaic system 800 that may have the potential to be energized at a dangerous voltage in a fault situation.

Inverter 845 may be implemented singly, as shown in FIG. 8, or in parallel with a plurality of inverters that are each connected in a parallel electrical configuration. A plurality of inverters, for example, may be used in circumstances where it is necessary to supply more AC than can be appropriately supplied by a single inverter, such as inverter 845. In photovoltaic system 800, inverter 845 connects to positive voltage conductor $V_+$ 825, neutral conductor N 830, negative voltage conductor $V_-$ 835, and safety ground conductor 840 of four conductor bipolar DC bus 820. Four conductor bipolar DC bus 820 supplies inverter 845 with DC electricity to invert into AC electricity. The AC electricity is then provided to AC output 850. Though indicated in FIG. 8 as a single line, AC output 850 may be implemented in one of a variety of alternating current configurations. For example, AC output 850 may be configured as a single phase output, as a split phase output, or as a three phase output. Furthermore, its output voltage magnitude and frequency may be configured in a variety of ways to meet the requirements of connected loads.

Thus, four conductor bipolar DC bus 820 provides an inherent efficiency in connecting various devices that output or receive DC electricity. Because short-string optimizer 815a and short-string optimizer 815b are implemented in parallel, these devices can easily transfer electrical current along four conductor bipolar DC bus 820. The same can be said of short-string optimizers 815c and 815d. Further, by providing a relatively controlled DC voltage range on four conductor bipolar DC bus 820, other components of photovoltaic system 800 can be designed and optimized to operate within the specified DC voltage range for four conductor bipolar DC bus 820. This enhances the simplicity of the design of photovoltaic system 800, enables easier interoperability of photovoltaic system 800 devices, makes the design of photovoltaic system 800 more robust, and lowers the cost of components in photovoltaic system 800.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A direct current bus comprising:
    a positive voltage conductor;
    a neutral conductor;
    a negative voltage conductor; and
    a safety ground,
wherein the positive voltage conductor, the neutral conductor, the negative voltage conductor and the safety ground are implemented as separate insulated conductors disposed together within a single molded wire connected between a DC-DC converter and a DC-AC inverter.

2. The direct current bus of claim 1, wherein the positive voltage conductor in the direct current bus receives positive voltage direct current electricity generated by an electrical generator.

3. The direct current bus of claim 2, wherein the electrical generator comprises one or more solar panels.

4. The direct current bus of claim 1, wherein the negative voltage conductor in the direct current bus receives negative voltage direct current electricity generated by an electrical generator.

5. The direct current bus of claim 4, wherein the electrical generator comprises one or more solar panels.

6. The direct current bus of claim 1, wherein the neutral conductor acts as a current return for the positive voltage conductor.

7. The direct current bus of claim 1, wherein the neutral conductor acts as a current return for the negative voltage conductor.

8. The direct current bus of claim 1, wherein the neutral conductor acts as a current return for both the positive voltage conductor and the negative voltage conductor simultaneously.

9. The direct current bus of claim 1, wherein the safety ground is connected to an earth ground.

10. The direct current bus of claim 1, wherein the safety ground carries substantially no current unless an electrical fault occurs in the direct current bus.

11. A system comprising:
 a direct current bus comprising:
  a positive voltage conductor connected to one or more DC-DC converters and a positive voltage conductor connector on an inverter,
  a neutral conductor connected to one or more DC-DC converters and a neutral conductor connector on the inverter,
  a negative voltage conductor connected to one or more DC-DC converters and a negative voltage conductor connector on the inverter, and
  a safety ground connected to one or more DC-DC converters and a chassis connector on the inverter; and
 a plurality of electrical generators.

12. The system of claim 11, wherein the plurality of electrical generators comprises a plurality of solar panels.

13. The system of claim 12, wherein direct current electricity generated by at least one solar panel within the plurality of solar panels is provided to the positive voltage conductor of the direct current bus.

14. The system of claim 13, wherein direct current electricity generated by at least one solar panel within the plurality of solar panels is provided to the negative voltage conductor of the direct current bus.

15. The system of claim 11, wherein the neutral conductor acts as a current return for the positive voltage conductor and the negative voltage conductor.

16. The system of claim 15, wherein the neutral conductor within the direct current bus is electrically connected to an alternating current neutral for the inverter.

17. The system of claim 11, wherein the safety ground is connected to a metal chassis component on at least the inverter.

18. The system of claim 11, wherein the safety ground carries substantially no current unless an electrical fault occurs in the direct current bus.

19. A direct current bus comprising:
 a first conductor;
 a second conductor;
 a third conductor; and
 a safety ground,
wherein the first conductor, the second conductor, the third conductor and the safety ground are implemented as separate insulated conductors disposed together within a single molded wire connected between a DC-DC converter and a DC-AC inverter.

* * * * *